United States Patent
Sade et al.

(10) Patent No.: US 9,781,096 B2
(45) Date of Patent: Oct. 3, 2017

(54) SYSTEM AND METHOD FOR OUT-OF-BAND APPLICATION AUTHENTICATION

(71) Applicant: Cyber-Ark Software Ltd., Petach-Tivka (IL)

(72) Inventors: Yair Sade, Herzelia (IL); Andrey Dulkin, Herzelia (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 0 days.

(21) Appl. No.: 15/192,682

(22) Filed: Jun. 24, 2016

(65) Prior Publication Data

US 2016/0308849 A1    Oct. 20, 2016

Related U.S. Application Data

(63) Continuation of application No. 13/911,103, filed on Jun. 6, 2013, now abandoned.

(60) Provisional application No. 61/668,044, filed on Jul. 5, 2012.

(51) Int. Cl.
| | |
|---|---|
| *G06F 7/04* | (2006.01) |
| *H04L 29/06* | (2006.01) |
| *G06F 21/42* | (2013.01) |
| *G06F 21/44* | (2013.01) |
| *G06F 21/52* | (2013.01) |

(52) U.S. Cl.
CPC ............ *H04L 63/08* (2013.01); *G06F 21/42* (2013.01); *G06F 21/44* (2013.01); *G06F 21/52* (2013.01); *H04L 63/10* (2013.01); *H04L 67/42* (2013.01)

(58) Field of Classification Search
CPC ............................... H04L 63/08; H04L 63/10
USPC ............................................................. 726/3
See application file for complete search history.

(56) References Cited

U.S. PATENT DOCUMENTS

| | | | |
|---|---|---|---|
| 6,044,155 | A | 3/2000 | Thomlinson |
| 2008/0120711 | A1* | 5/2008 | Dispensa ............ H04L 63/0869 726/7 |
| 2008/0196101 | A1 | 8/2008 | Sade et al. |
| 2010/0125635 | A1 | 5/2010 | Axelrod |
| 2012/0030742 | A1 | 2/2012 | Laundblade |
| 2012/0159603 | A1 | 6/2012 | Queck |
| 2014/0013390 | A1 | 1/2014 | Sade et al. |

OTHER PUBLICATIONS

Examination Report of the European Patent Office in European Application No. 13170744.0 dated Feb. 23, 2017 (8 pages).

* cited by examiner

*Primary Examiner* — Anthony Brown
(74) *Attorney, Agent, or Firm* — Finnegan, Henderson, Farabow, Garrett & Dunner LLP

(57) ABSTRACT

Application-to-Application authentication features using a second communication channel for out-of-band authentication separate from a communication channel of a request from a client to a server. Authentication information is associated with a component of the system such as the request or the client application, while being collected independent of interaction with the client application initiating the request. Implementations provide improved security over existing solutions using in-band or other means of collecting authentication information.

28 Claims, 3 Drawing Sheets

SYSTEM AND METHOD FOR OUT-OF-BAND APPLICATION AUTHENTICATION

CROSS-REFERENCE TO RELATED APPLICATIONS

This application claims the benefit of U.S. patent application Ser. No. 13/911,103, filed Jun. 6, 2013, which in turn claims the benefit of U.S. Provisional Patent Application No. 61/668,044, filed Jul. 5, 2012, both of which are hereby incorporated by reference in their entirety.

FIELD OF THE INVENTION

The present invention generally relates to computer security, and in particular, it concerns a method for application authentication.

BACKGROUND OF THE INVENTION

An inherent function of many applications is sending requests to other applications and receiving responses from other applications. These requests include access to network resources, requests for specific information, access to various APIs (Application Programming Interfaces) and many other needs. This architecture is generally known as client-server, where a first (requesting) application acting as a client sends a request to a second (receiving) application acting as a server. The receiving application (known as the server), needs to authenticate the requesting application, to validate that the request should be granted. Specifically, the receiving application needs to validate that the request is legitimate, i.e. originated in the permitted application, and was not sent by an impersonator (human or application user purporting to be the legitimate application).

Application authentication is known as a topic of interest in the computer field. Application authentication is required both when the application acts on behalf of a user (for example, a browser application accessing a web server) and when the application acts independently (for example, when an application accesses a database to perform a scheduled task) or a batch process. There are also cases when the application acts on behalf of a user, while also authenticating to a network resource with dedicated credentials, separate from those used by the user (for example, a user connects through an application, which also accesses a database to retrieve some information). Conventionally, the problem of authentication is addressed by a combination of the following conventional techniques:

1. In a first technique, credentials are presented by the application—such as passwords, PKI (Private Key Infrastructure) certificates, or other credentials.
2. In a second technique, a provider provides the application with the needed credentials, which are then used to access the network resources.
3. In a third technique, NAC (Network Access Control) controls access to the network and the network resources by identifying the machine (physical and operating system, also referred to as "the environment") on which the application is running. NAC is primarily designed for end user access and not for application-to-application controls.

These conventional techniques are lacking in several aspects. In the first technique, credentials are stored within an application or in the application's environment, and are used when needed. However, this technique exposes the stored credentials to other parties (human or programmatic) who have permissions to operate in the same environment. These parties can, potentially, access and use the credentials to be falsely authenticated as the intended application.

The second technique addresses the above-mentioned problem by performing checks on the application before providing it with the necessary credentials. However, these steps are performed on the request before the request reaches the network resource or server, thus the network server has no effective way of validating that these checks were indeed performed. The network server receives the request from the application and the credentials, and has no way to validate further that the application was indeed the source of the request.

The third technique (NAC) mainly identifies the environment in which the application is running and is usually employed to validate that only specific environments have access to organizational network. This technique is not designed to identify, and does not identify, the specific application requesting access to network resources.

A related field of authentication is that of human user authentication, which deals with authenticating a user of a specific application. Several solutions in this field employ "out-of-band" authentication (OOBA), such as basing their decision on something the user has (for example, possession of a mobile phone), knows (additional information, such as mother's maiden name) or is (for example, biometrics).

Examples of conventional OOBA techniques include U.S. application 2012/0159603 to Tobias Queck for Mobile Out-Of-Band Authentication Service. Queck teaches enabling authentication of an application session at a client machine by using authentication values and user-identification values that are received from a mobile communication device. The mobile communication device provides an out-of-band channel for validating the session and enables secure authentication for a variety of applications. Queck solves the problem of stronger user authentication by adding authentication of the user's platform (in this case the user's mobile communication device). This additional/second authentication is done by sending a token to the purposed originating device and checking whether it is received and responded to accordingly. While Queck adds another layer of conventional authentication, this teaching does not suggest a solution for application authentication, as this technique only verifies the device (that is, the environment) of the application and not the application itself.

Another conventional authentication technique is taught in U.S. application 2012/0030742 to Laurence Lundblade for Methods and apparatus for providing application credentials. Lundblade teaches providing an application credential for an application running on a device, wherein the application credential is used by the application to authenticate to a data server. The method includes receiving a request to generate the application credential, wherein the request includes an application identifier. The method also includes generating the application credential using the application identifier and a master credential associated with the device. While Lundblade does discuss application authentication, this technique is conventional in-band authentication, and hence suffers from the same problems as other in-band techniques. Specifically, other parties can impersonate the original application, send the request to generate the application credential, and falsely complete the authentication process.

Another known technique is described in U.S. application 2008/0196101 to Yair Sade (assigned to Cyber-Ark Software, Ltd.) for Methods and Systems for Solving Problems with Hard-Coded Credentials. Sade teaches methods for handling hard-coded credentials, and provides methods for intercepting credential usage, mapping to other credentials, and replacing the credentials with valid application credentials. This is an example of the provider technique mentioned above. The request is intercepted and valid credentials are placed into the request, which is then sent to the server. However, the server has no independent way of validating the source of the request and must rely on the validity of the served credentials.

There is therefore a need for a system and method of application authentication that is out-of-band and provides increased security compared to current techniques, specifically, authenticating both the application credentials and the fact that the credentials are indeed presented by the authenticated application.

DEFINITIONS AND TERMINOLOGY

The following brief list of some of the terms used in this document is provided for the convenience of the reader and to help define the general use of these terms in this document. The following definitions should not be considered limiting, and are further discussed in the below description and/or the appropriate Standards documents.

Machine—is used for simplicity and clarity, but should not be interpreted as limiting implementation of the current invention. As will be obvious to one skilled in the art, the term machine can include computers and computing systems (for example, physically separate locations or devices) and processors, processing systems, computing cores (for example, shared devices) and similar systems, modules, and combinations on which implementations can be instantiated. In general, a machine is an execution environment for computer software, including a physical or virtual hardware environment and an operating system.

While the current description uses a typical case of implementation on two separate machines (computers), as described above in reference to the term "machine", use of this case is non-limiting. Based on the current description, one skilled in the art will be able to implement embodiments of the current invention on other machines or a single machine (combinations of platforms).

Authentication agent or simply "agent"—refers to computer software used to achieve a specific purpose, such as collecting information, and generally refers to an information collection utility. Functionality of agents includes querying a client, for example the operating system on a client machine or a client application. The current invention can be implemented with both agent-less and agent-based implementations. Agent-based implementations include both pre-installed and installed-on-demand agents, which in turn can be volatile (removed after performing their functionality) or persistent (remain on the system for future use).

Application—generally refers to computer software.

Application authentication—generally refers to the process of confirming that an application is what the application claims to be. This usually is a required step prior to granting access and operation permissions, and usually includes validating (verifying) the identity, proper functioning, and integrity of an application.

Authentication/authenticating information—information used for authentication, for example credentials.

Challenge—private information provided (to a user/agent) to be used in a response (from the user/agent) for authentication (to authenticate the user/agent). Note that "challenge" is also used in conventional authentication techniques to refer to the prompt (the "challenge" to the user/agent) to provide the private information (the response/reply). For example, a user is given a code (the challenge) which the user then provides when challenged.

Channel—generally a communications path. For simplicity in the current description, generally between two applications over a network. For example, a channel can be a TCP/IP connection.

Client and server—used for simplicity and clarity in the current description, client applications and server applications are typically applications on a first (client) machine and second (server) machine, respectively. Clients and servers are typically connected via at least one network using at least one channel. The use of the terms "client" and "server" should not be interpreted as limiting. One skilled in the art will realize that the functionality described in the current description in relation to clients and servers can also be implemented on a single machine or plurality of machines, or distributed across a multitude of machines. In other words, the client application(s) and server application(s) can each be on a distinct machine, or both the client applications and server applications can be implemented on the same machine as the application generating the request.

In-band authentication (IBA)—Utilizing the same network or channel for both communication and authentication between two parties, devices, or machines.

Out-of-band authentication (OOBA)—Utilizing a channel other than a primary (first) channel to perform identification. In a preferred embodiment, using two separate networks or channels for authentication, a primary network/channel generally used to communicate and authentication (primary authentication), and a second network/channel used for performing additional authentication, between two parties, devices, or machines.

PIN—Personal identification/identifier number.

Separate/second channel—a channel other than the primary, or first channel. As will be known to one skilled in the art, separate communication channels may use either common or different physical means of implementation, including, but not limited to two TCI/IP sessions on the same network, two physically separate computer networks, two different types of network (for example, Ethernet and Cellular), and common infrastructures with logical separation (for example, a common Ethernet network with a first and second VLAN (virtual local area network) implementing the first and second channels). A second channel is considered out-of-band with respect to a first channel.

One skilled in the art will realize that in the current description, references to a second channel are in the singular for clarity, as a "second channel" can be also be implemented as "second channels" or "at least one channel other than the first channel". In other words, more than one channel, other than the primary channel, can be used for implementing the features of a second channel. For example, a server can communicate via a second channel with an agent on a client machine, and the agent can transmit authentication information via a third channel to the server.

SUMMARY

According to the teachings of the present embodiment there is provided a system for authentication including: a server machine configured to: receive, via a first channel, a request from a client machine, the request associated with a client application on the client machine; connect, via a second channel that is separate from the first channel, to the client machine to request authentication information; receive, via the second channel, the authentication information; validate, based on the authentication information, the request, and a client machine configured to: collect the authentication information, wherein the authentication information is associated with a component of the system selected from the group consisting of: the request; and the client application, and wherein the authentication information is collected independently of interaction with the client application.

In an optional embodiment, the server machine is further configured to effect a preliminary request validation of the request prior to connecting via the second channel to the client machine, the connecting being contingent on a success of the preliminary request validation.

In another optional embodiment, the server machine is further configured to: initiate a transmission, in response to the request from the client machine, of an authentication agent to the client machine; and receive the authentication information from the authentication agent.

According to the teachings of the present embodiment there is provided a system for authentication including: a server machine configured to: receive, via a first channel, a request from a client machine, the request associated with a client application on the client machine; receive, via a second channel that is separate from the first channel, authentication information; wherein the authentication information is associated with a component of the system selected from the group consisting of: the request; and the client application, and wherein the authentication information is collected independently of interaction with the client application.

In an optional embodiment, the server machine is further configured to connect, via the second channel, between the server machine and the client.

In another optional embodiment, the server machine is further configured to connect from the server machine to the client machine via the second channel to request the authentication information.

In another optional embodiment, the server machine is further configured to effect a preliminary request validation of the request prior to connecting via the second channel to the client machine, the connecting being contingent on a success of the preliminary request validation In another optional embodiment, the server machine is further configured to: initiate a transmission, in response to the request from the client machine, of an authentication agent to the client machine; and the authentication information from the authentication agent.

According to the teachings of the present embodiment there is provided a system for authentication including: a client machine configured to collect authentication information for authenticating a request sent from a client application, wherein the client machine is configured to send the request via a first channel; wherein the client machine is configured to send the authentication information via a second channel; wherein the authentication information is associated with a component of the system selected from the group consisting of: the request sent from the client machine; and the client application on the client machine, and wherein the authentication information is collected independent of interaction with the client application.

According to the teachings of the present embodiment there is provided a method for authentication including the steps of: receiving at a server machine, via a first channel, a request from a client machine, the request associated with a client application on the client machine; connecting, via a second channel that is separate from the first channel, between the server machine and the client machine; collecting the authentication information on the client machine; sending the authentication information from the client machine via the second channel to the server machine; and receiving at the server machine, via the second channel, authentication information from the client machine, wherein the authentication information is associated with a component of the system selected from the group consisting of: the request; and the client application, and wherein the authentication information is collected independently of interaction with the client application.

In an optional embodiment, the connecting is from the server machine to the client machine to request the authentication information.

In another optional embodiment, further including the step of: effecting a preliminary request validation of the request prior to connecting via the second channel to the client machine, the connecting being contingent on a success of the preliminary request validation.

In another optional embodiment, further including the step of initiating a transmission, in response to the receiving of the request from the client machine, of an authentication agent to the client machine; wherein the receiving of the authentication information is from the authentication agent.

In another optional embodiment, further including the step of: validating the request based on the authentication information.

According to the teachings of the present embodiment there is provided a method for authentication including the steps of: receiving at a server machine, via a first channel, a request from a client machine, the request associated with a client application on the client machine; and receiving at the server machine, via a second channel that is separate from the first channel, from the client machine, authentication information; wherein the authentication information is associated with a component of the system selected from the group consisting of: the request; and the client application, and wherein the authentication information is collected independently of interaction with the client application.

In another optional embodiment, further including the step of: connecting, via the second channel, between the server machine and the client machine.

In another optional embodiment, the connecting is from the server machine to the client machine to request the authentication information.

In another optional embodiment, further including the step of: effecting a preliminary request validation of the request prior to connecting via the second channel to the client machine, the connecting being contingent on a success of the preliminary request validation.

In another optional embodiment, the further including the steps of: initiating a transmission, in response to the receiving of the request from the client machine, of an authentication agent to the client machine; and receiving the authentication information from the authentication agent.

In another optional embodiment, the further including the step of: validating the request based on the authentication information.

According to the teachings of the present embodiment there is provided a method for authentication including the steps of: sending a request from a client application on a client machine via a first channel to a server machine; and sending authentication information from the client machine via a second channel to the server machine, wherein the authentication information is associated with a component selected from the group consisting of: the request; and the client application, and, wherein the authentication information is collected independent of interaction with the client application.

In another optional embodiment, the authentication information is provided by an authentication agent selected from the group consisting of: an agent pre-installed on the client machine; an agent transmitted to and executed on the client machine, following a connection from the server machine to the client machine, the agent remaining on the client machine after the agent sends the authentication information to the server machine; and an agent transmitted to and executed on the client machine, following a connection from the server machine to the client machine, the agent removed from the client machine after the agent transmits the authentication information to the server machine.

In another optional embodiment, the authentication information is provided by an operating system of the client machine.

In another optional embodiment, the authentication information is provided from one or more query responses to one or more corresponding queries independent of interaction with the client application.

In another optional embodiment, the authentication information is provided from one or more query responses to one or more corresponding queries to components of the client machine other than the client application.

In another optional embodiment, the request is for access credentials to network resources or other server machines.

According to the teachings of the present embodiment there is provided a computer-readable storage medium having embedded thereon computer-readable code for authentication, the computer-readable code including program code for: receiving at a server machine, via a first channel, a request from a client machine, the request associated with a client application on the client machine; connecting, via a second channel that is separate from the first channel, between the server machine and the client machine; collecting the authentication information on the client machine; sending the authentication information from the client machine via the second channel to the server machine; and receiving at the server machine, via the second channel, authentication information from the client machine, wherein the authentication information is associated with a component of the system selected from the group consisting of: the request; and the client application, and wherein the authentication information is collected independently of interaction with the client application.

According to the teachings of the present embodiment there is provided a computer-readable storage medium having embedded thereon computer-readable code for authentication, the computer-readable code including program code for: receiving at a server machine, via a first channel, a request from a client machine, the request associated with a client application on the client machine; and receiving at the server machine, via a second channel that is separate from the first channel, from the client machine, authentication information; wherein the authentication information is associated with a component of the system selected from the group consisting of: the request; and the client application, and wherein the authentication information is collected independently of interaction with the client application.

According to the teachings of the present embodiment there is provided a computer-readable storage medium having embedded thereon computer-readable code for authentication, the computer-readable code including program code for: sending a request from a client application on a client machine via a first channel to a server machine; and sending authentication information from the client machine via a second channel to the server machine, wherein the authentication information is associated with a component selected from the group consisting of: the request; and the client application, and wherein the authentication information is collected independent of interaction with the client application.

According to the teachings of the present embodiment there is provided a computer program that can be loaded onto a server machine connected through a network to a client machine, so that the server running the computer program constitutes a server machine in a system according to the current description.

According to the teachings of the present embodiment there is provided a computer program that can be loaded onto a client machine connected through a network to a server machine, so that the machine running the computer program constitutes a client machine in a system according to the current description.

BRIEF DESCRIPTION OF FIGURES

The embodiment is herein described, by way of example only, with reference to the accompanying drawings, wherein.

DETAILED DESCRIPTION—FIGS. 1 TO 4

The principles and operation of the system and method according to a present embodiment may be better understood with reference to the drawings and the accompanying description. A present invention generally relates to computer security, and in particular, concerns a method for application authentication.

Application-to-Application authentication features using a second communication channel for out-of-band authentication separate from a communication channel of a request from a client to a server. Authentication information is associated with a component of the system such as the request or the client application, while being collected independent of interaction with the client application initiating the request. Implementations provide improved security over existing solutions using in-band or other means of collecting authentication information.

As a general overview, without limiting implementations of the current invention, a server machine receives, via a first channel, a request from a client machine, the request associated with a client application on the client machine. The server connects, via a second channel that is separate from the first channel, between the server machine and the client machine. Authentication information is collected on the client machine. The collected authentication information is sent from the client machine via the second channel to the server machine. The server machine receives via the second channel, authentication information from the client machine. In particular, the authentication information is associated with a component of the system such as the request and/or the client application, and the authentication information is collected independently of interaction with the client application.

Figure 1:
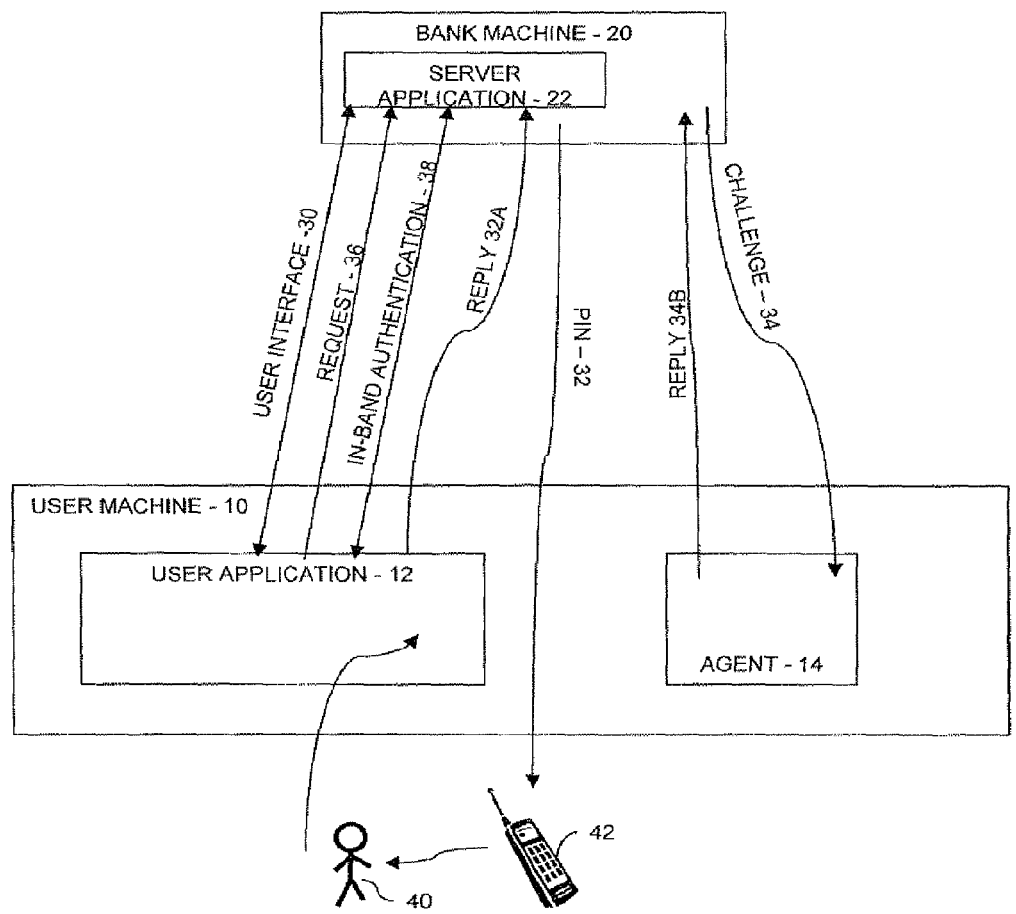
FIG. 1 is a simplified diagram of conventional authentication.

Referring to FIG. 1, a simplified diagram of conventional authentication, a user application 12 on user machine 10 sends a request 36 to a server application 22 on a bank machine 20. User machine 10 is generally a first machine, also referred to in this document as a client, client computer, or client machine. Bank machine 20 is generally a second machine, also referred to in this document as a server, server computer, or server machine. Generally, requests are sent via a primary (first) communications channel via interfaces, such as user interface 30.

In the case where a user application 12 wants to authenticate to a server application 22, in-band authentication 38 (such as transmission of access credentials) can be used between the two applications. As is known in the art, in-band authentication (IBA) can be via user interface 30 usually as part of a request, such as request 36, or as a separate request using the primary communications channel.

In a popular case of OOBA, a cellular network is used. In this exemplary case, a user 40 of user application 12 wants to access an online banking service. The user 40 employs user application 12 to access via user interface 30 the banking application (server application 22) on the bank machine 20. The server application sends via SMS (short message service) a onetime password (shown as PIN 32) to a cell phone 42 of user 40. User 40 enters the received PIN 32 information in the user application 12, which sends the information via reply 32A to server application 22 to complete the authentication. In this case, the primary channel is the user interface 30, including an online login screen where the user enters their login information. The second separate channel providing the OOBA is the cellular network. This added layer of security in OOBA versus in-band authentication prevents the likelihood of hackers and malware from compromising access to the complete authentication process, in this case by providing the additional information that user 40 actually possesses device (mobile phone) 42, which is associated with this user in server application 22 and serves as part of the user's authentication.

In another case of OOBA, a user 40 of user application 12 wants to be authenticated to server application 22. After receiving request 36, server application 22 sends challenge 34 information to agent 14 on user machine 10. Agent 14 collects identifying information about user machine 10, and then sends reply 34B from user machine 10 to bank machine 20. Reply 34B includes information that enables server application 22 to validate that challenge 34 was properly received and validating information regarding the user machine 10. For example, that user machine 10 is the machine associated with user 40 or that user machine 10 has an up-to-date antivirus program).

Note that conventional techniques include validating information for the machine (on which the agent, such as agent 14, resides), but do not include validating information regarding the application, such as user application 12. In other words, this conventional OOBA technique verifies the machine on which the agent resides, but not the application sending the request 36.

As will be obvious to one skilled in the art, FIG. 1 is a simplified diagram, with limited examples of simplified elements, to provide a convenient basis for assisting and clarifying descriptions in this document.

Conventional techniques use in-band authentication, which can be characterized as an application using information internal to the application (such as user application 12) for authentication. Other conventional techniques use OOBA, which can be characterized as using information other than information internal to the application (such as agent 14 collecting information regarding user machine 10, or PIN 32 received via cell phone 42 by user 40). An implementation of the current invention addresses a different problem—that of enabling server application 22 to validate that request 36 indeed originated in application 12 and not just by user 40 or on machine 10. In other words, a feature of the current invention is application-to-application authentication, as opposed to techniques designed for end-user access. To facilitate solving this problem, an OOBA technique is used to connect to machine 10 and collect authenticating information regarding application 12, for example by employing an agent (similar to agent 14, but with different functionality) and to return the information to the server to accomplish proper authentication. This problem is not resolved by existing techniques. Note, that one skilled in the art will realize that in this characterization of the implementation, "authenticating information" refers to information about the application that is specific to the application (such as local path on machine, process names, file sizes and more), but available to other applications residing on the same machine (processes, operating system, etc.), and should not be confused with information internal to the running of the application. The authenticating information can be considered application specific information, in contrast to general system (such as user machine 10) information.

Figure 2:
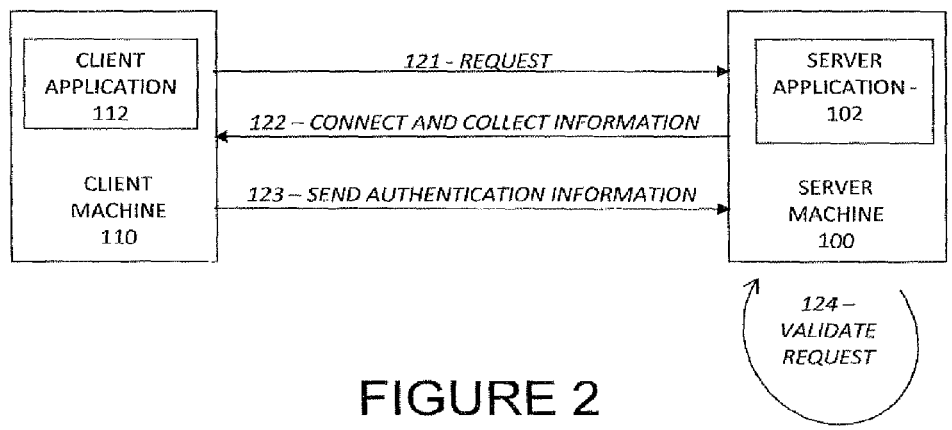
FIG. 2 is a diagram of out-of-band application authentication.
Figure 3:
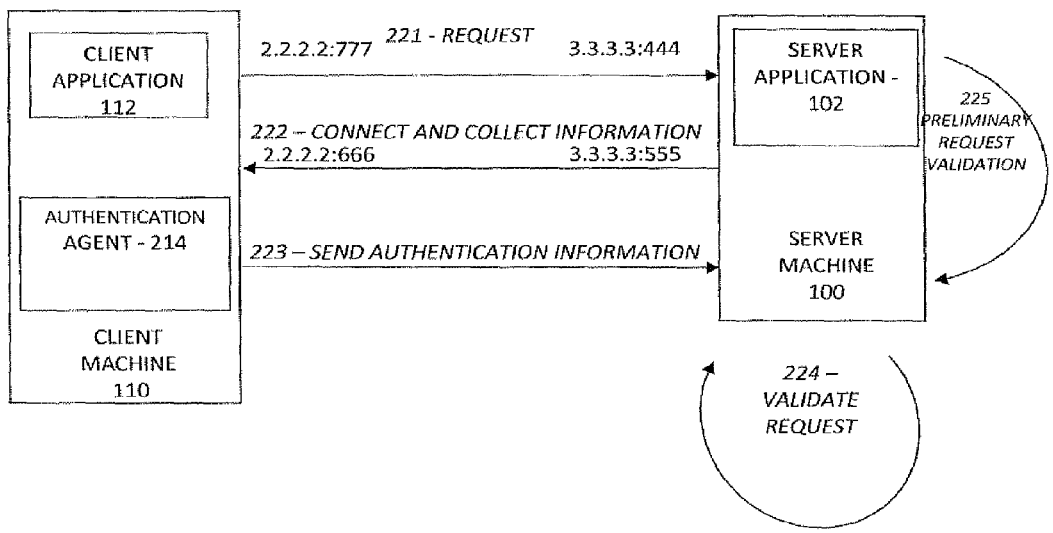
FIG. 3 is a diagram of an exemplary implementation of out application authentication.

Refer now to FIG. 2, a diagram of out-of-band application authentication and FIG. 3, a diagram of an exemplary implementation of out-of-band application authentication. A server machine 100 and server application 102 are installed to function as a destination server for requests 121 or as an intermediary/proxy server to confirm or deny requests from client applications 112 on a client machine 110 to other applications or network resources or assets. Client machine 110 and server machine 100 are typically connected via at least one network using at least one channel. Server application 102 is configured to listen for requests (such as request 121) from applications on a network to which server machine 100 is connected, recognize an application (such as client application 112) which generated the request, and recognize a machine (such as client machine 110) from which the request originated. Server application 102 receives authentication information, such as the results of authentication agent 214, analyzes the authentication information, and makes a decision regarding whether or not a received request 121 was indeed authenticated correctly and/or validate (grant or deny) (124) the request (121).

The application authentication process is initiated by a request 121 originating from a client application 112 on client machine 110 to the server application 102. Request 121 may have characteristics including, but not limited to, time, originating IP address and port, destination IP address and port, contents, and protocol. Request 121 may also include in-band authentication information, such as application or user credentials (for example, username/password combination). Request 221 is a non-limiting example of request 121 sent from client machine 110 via IP:port 2.2.2.2: 777 to IP:port 3.3.3.3:444 on server machine 100).

An optional step of preliminary request validation 225 can be performed by server application 102 by checking characteristics and content of request 221 to validate whether this request has a potential of being granted. For example, by validating originating and destination. IP address and port, checking the contents for username/password combination or any other characteristic of the request. If preliminary request validation 225 fails, requests can be denied, without the need for further steps.

The server application 102 then initiates the OOBA process, connecting to the originating machine, client machine 110, shown as arrow connection 122, "connect and collect information". Connection (connect and collect information) 222 is a non-limiting example of connection 122, from server machine 100 on IP:port 3.3.3.3:555 to IP:port 2.2.2.2:666 on client machine 110. In the current embodiment, the first channel (primary channel) is used for connection and primary authentication (the application provides credentials which are used for primary authentication) while a second channel (OOB relative to the first channel) is used for additional authentication. The use of additional authentication provides a stronger authentication than the use of only the primary authentication.

Connection 122 is via a separate/second channel from request 121. In other words, connection 122 is established as an out-of-band channel (with regard to the channel of request 121). A significant feature of the current embodiment is that the collection of information session (connection 122) is out-of-band with respect to the original request session (request 121). This communication using separate channels (connections/ports) between machines facilitates providing distinctive flexibility and security benefits over conventional methods (where in conventional in-band authentication, the same channel [connection] is used for both requesting information and authenticating the requestor). The session of connection 122 can be established by known methods, such as administrative or user passwords, PKI, and/or other credentials and known methods of secure access to enable server application 102 to access client machine 110.

After a connection is established, authentication information is collected. Authentication information includes information regarding the client application 112 or request 121. A feature of collecting information on the client machine is that authentication information is collected independent of interaction with the client application 112. In other words, collection of authentication information, such as queries on the client machine, do not require a response from client application 112. A first exemplary method of collecting authentication information is to query the operating system of client machine 110. For example, in a Windows™ environment, server application 102, can connect 122 using Windows WMI API to client machine 110, and find the executable characteristics of client application 112. This can be done for example, by locating the client application 112 Windows process name according to the TCP/IP port that the client application 112 used to connection to the server application 102. Once authentication information is obtained, the authentication information can be transmitted back (send authentication information 123) over the WMI channel to server application 102. In a second example, on Unix systems the server application 102 can initiate SSH connection 122 to client machine 110, investigate the environment of client machine 110, locate client application 120 characteristics, and send them back 123 to server application 102 over the SSH channel.

A second method of collecting authentication information is to use an authentication agent (or simply agent) 214 on client machine 110. In the current example, agent 214 is a local agent on client machine 110. Use of an agent is optional, as sufficient information for authentication can typically be collected by using the services of the client machine's operating system. In other words, the required functionality of an agent can typically be achieved using the services provided by the operating system on client machine 110, without requiring an agent on client machine 110. In a case where an authentication agent is being used, use of agents are known in the art. Agents can be deployed by various methods including, but not limited to, pre-installing an agent on a client machine and downloading an agent to a client machine (procedurally an additional part of connection 122 or on-demand). In addition to collecting authentication information, for example by querying the operating system, an agent can optionally and typically is responsible (configured) for transferring the collected authentication information (sending 223) from a client machine 110 to the server machine 100/server application 102. Note that while an agent is typically deployed on a client machine, such as agent 214 on client machine 110, deployment of agents in other locations and configurations is known in the art. Generally, an agent 214 should be able to collect information regarding an application 112 and facilitate the collected information being sent to server machine 100. An agent 214 can also collect information regarding request 121. Based on this description, one skilled in the art will be able to implement an agent to meet the specific needs for the system on which the agent is deployed.

In this description, for clarity, a typical case is described where server application 102 connects to client machine 110 to initiate collection of authentication information. In an alternative implementation, in a case where client machine 110 includes an agent 214, agent 214 can monitor client machine 110 and/or client application 112 to detect events that may require authentication information to be collected. Alternatively, client machine 110 can include additional modules, such as an interception module (not shown in the diagrams). The interception module can monitor client machine 110 and notify agent 214 of an event requiring authentication. Agent 214 can initiate a connection to server machine 100. This alternative implementation is not shown in the diagrams, but is similar to connection 222, though in the opposite direction.

There are at least two types of authentication information that can be collected. A first type of authentication information includes information regarding the request (such as request 121). Collection of this first type of information can be viewed as the answer(s) to the question "What application originated the request?" One method of answering this question (collecting this information) is by using the distinguishing characteristics of the request. For example, querying client machine 110 to find out what process initiated a connection with an originating port of request 121. In the current example, request 221 originates from port 777, so client machine 110 is queried for what process is associated with port 777. In the current example, port 777 is associated with client application 112. Responses to this query can include process name, application name, or other distinguishing characteristic that determine what application originated the request. The responses constitute authentication information, and are sent from client machine 110 to server machine 100, as shown by arrow "send authentication information" 223. The authentication information is analyzed on server machine 100, such as by server application 102, and a decision is made regarding whether or not received request 121 was indeed authenticated correctly and/or validate (grant or deny) 124 the request 121.

The collection of this first type of information is optional. For example, in an implementation where an assumption is made that the originating application is already known, this first type of information does not need to be collected. Note that this first type of authentication differs from preliminary request validation 225, described above. While both this first type of authentication and preliminary request validation 225 can be based on, or initiated on, common characteristics and content of request 221, these techniques authenticate/ validate different parameters. As described above, preliminary request validation 225 is performed by server application 102 using parameters (characteristics and/or content) of request 221. In contrast, first type of authentication is performed on client machine 110, where characteristics and/or content of request 221 are used to query (222) client machine 110 or agent 214 regarding request 221. In response to this query, the client machine 110 or agent 214 responds by providing parameters regarding distinguishing characteristics of request 221. These parameters regarding distinguishing characteristics of request 221 are then used to perform authentication. For example, these parameters are sent from client machine 110 via send authentication information 223 in a secondary channel to server machine 100 where server application 102 validates 224 request 221.

A second type of authenticating information includes information regarding the application (client application 112) supposedly (based on first type authenticating information described above or deduced from request 121) making the request (request 121). Collection of this second type of information can be viewed as the answer(s) to the question "What are the current characteristics of the application that originated the request?" One method of answering this question (collecting this information) is by using the distinguishing characteristics of the application. An example is querying client machine 110 to find out details of the application that supposedly issued this request. Responses to this query can include the process name, application path, size of files and directories, results of a hash-function calculation on components of the application, results of a hash-function calculation on executable files of the application or other calculations on application files and other related processes and files. This information can be later used to determine the authenticity of the application supposedly making the request. As noted above, responses can be provided by the operating system on a client machine 110, or by an authentication agent 214 (pre-installed, installed-on-demand, etc.).

The collected authentication information is then transmitted back to server application 102, shown as arrow "send authentication information" 223. For clarity, both the connection 222 and the reply transmitting authentication information 223 are described as using a second channel, as compared to request 221 that uses a first channel. Note, however, that connection 222 and sending authentication information 223 are separate arrows, and as defined above can use the same or separate channels. For example, a server can communicate via a second channel (actually one or more channels other than the first channel) with an agent on a client machine, and the agent can transmit authentication information via a third channel (actually one or more channels other than the first channel and/or other than the second channel) to the server.

Server application 102 uses the transmitted authentication information to determine if the application is properly authenticated, and if the original request should be granted or denied, shown as "validate request" 224. Techniques for determining authentication (authenticating) are known in the art and include, but not limited to, authenticating based on pre-stored policy, configuration, or other known methods for comparing and making a validation decision. Based on this description, one skilled in the art will be able to select an authentication technique appropriate for a particular implementation.

A non-limiting example is now described for clarity. A typical use case is an organizational application, such as an ERP (Enterprise Resource Planning) application that needs to access a sensitive database. The ERP application sends a request to a server machine on which the database resides and uses dedicated credentials for authentication. Prior to granting the request, the server application connects via a second channel to the machine from which the request originated and checks two aspects—that the request indeed came from the ERP application (and not some other entity impersonating the application), and that the ERP application parameters (such as path on disk, process name, executable hash computation value and others) have not changed (since changed parameters can indicate potential compromise of the ERP application).

A preferred implementation includes a client application, which needs to access a network resource (such as a database), while access credentials to the network resource are managed by a privileged identities management system. A server machine acts as a credentials provider. The client application sends a request to the server machine requesting access credentials to the database. The credentials provider (server machine) connects via a second channel to the client machine from which the request for access credentials originated and checks whether the application is valid (such as intact—residing at an expected path, a hash computation value is as expected, and other authentication parameters). If the application is intact, the request for access credentials to the network resource is processed and the access credentials are sent to the requesting client application.

Another non-limiting example is of a bank that wants to insure the security of requests from user clients to the bank's server. Prior to operation of the system, the bank contacts the author of a client application, and receives a private validated copy of the client application code, or a validated hash value of the application code. In operation, the bank's server receives a request on a first connection from a supposed application on a user client. The system uses a second connection from the bank's server back to the user client to get a hash value of the application on the user client. The bank server can then compare the validated hash value on the server to the hash value from the user client. If the hash values are not identical, the application on the user client may have been compromised, and the bank server rejects the request.

Figure 4:
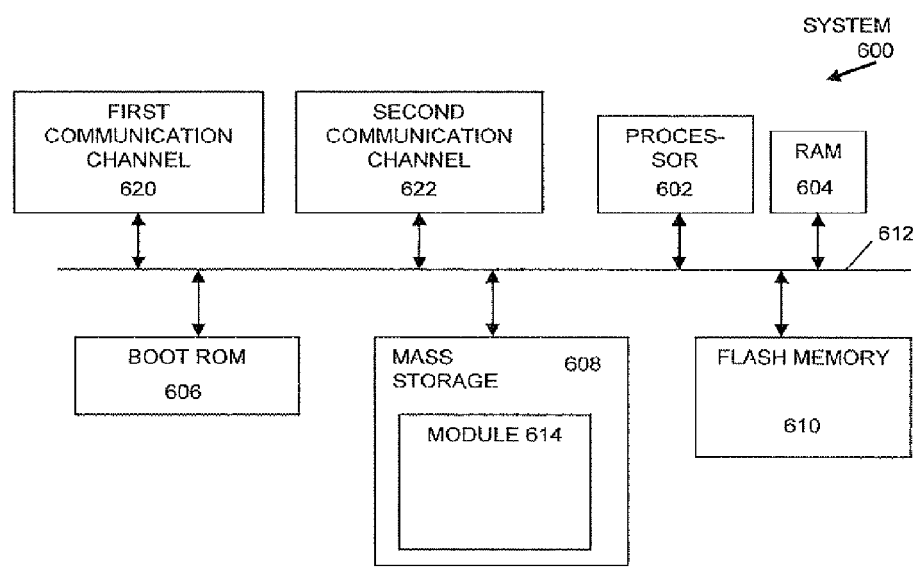
FIG. 4 is a high-level block diagram of a processing system for embodiments of a server machine.

FIG. 4 is a high-level block diagram of a processing system 600 for embodiments of a server machine 100 (second machine of the current invention). System (processing system) 600 includes a processor 602 and four memory devices: a RAM 604, a boot ROM 606, a mass storage device (hard disk) 608, a flash memory 610, a first communication channel 620, and a second communication channel 622, all communicating via a common bus 612. A module (processing module) 614 is shown on mass storage 608, but as will be obvious to one skilled in the art, could be located on any of the memory devices.

Mass storage device 608 is a non-limiting example of a computer-readable storage medium bearing computer-readable code for implementing the data storage methodology described herein. Other examples of such computer-readable storage media include read-only memories such as CDs bearing such code.

System 600 may have an operating system stored on the memory devices, the ROM (606) may include boot code for the system, and the processor (602) may be configured for executing the boot code to load the operating system to RAM 604, executing the operating system to copy computer-readable code to RAM 604 and execute the code. Communication channels 620 and 622 may be separate channels, such as two Network Interface Controllers (NICs), the same interface controller enabling separate concurrent network connections or other possible communicating channels.

As can be seen from the above description and example, a feature of the current invention is that authentication can be done "out-of-band", that is, authentication is done separate from client application 112, and does not rely on interaction with application 112. In other words, collection of authentication information is independent of responses from the client application 112 and communication of authentication information is in a channel independent of a channel used by the client application. This feature of providing verification independent of a requesting application at least in part facilitates improved authentication over existing solutions. In particular, improved authentication of the identity and integrity of a requesting application.

As can be seen from the above description, conventional solutions generally use in-band techniques, such as in-band authentication to authenticate the application and requests. Such techniques rely on authenticating information (such as access credentials) being transmitted with the request, hence the authentication process relies solely on information provided with the request. This makes such solution vulnerable to impersonation—a malicious party with the valid credentials can impersonate the legitimate application and successfully pass the authentication.

Another relevant technique is NAC (network access control), which provides information regarding the machine (that is, the environment) from which the request originated, and enforces access control based on this information. Generally, NAC does not provide information regarding a specific application, and even when NAC does provide this information, this information is not used to authenticate a specific request. For example, a NAC agent can report whether an antivirus is up-to-date and running on the client machine, but does not provide information regarding a specific application that sent a specific request. NAC usually requires installing on a client machine an agent to collect required information. This information is used by the NAC system to decide whether a request to connect to network resources from the client machine should be granted or denied. In contrast to NAC, which serves to authenticate the client machine and the environment from which the request originated, the current embodiment authenticates the specific application that originated the request. The current embodiment includes a request for additional authentication information and is initiated by a server application. In contrast to solutions that use in-band communications, such as relying on authenticating information transmitted with the request, the current embodiment uses out-of-band communications to retrieve additional authenticating information.

Conventional solutions for human user authentication include using a human's ability to operate devices, the biometric qualities possessed by humans, and/or a person's knowledge. In contrast, applications employ unique interfaces and communication methods that are not used by human users. The interfaces of applications create distinguishing characteristics to an application's request. A current embodiment uses the application characteristics and interfaces for authenticating an application.

While some components of the current invention may currently be in use in the field, the innovative combination of components and methods are not obvious from the existing techniques. This innovation can be seen from the long-standing need for a solution for application authentication, without teaching or suggestion of the method and system of the current invention. Specifically, the current embodiment includes using a separate, out-of-band authentication process to authenticate an application that sent a request.

While the above embodiments have been generally described as using secure channels, for example, secure connections using PKI or other known secure access methods, implementations are also possible using non-secure connections.

Note that a variety of implementations for modules and processing are possible, depending on the application. As will be obvious to one skilled in the art, the elements of FIG. 2 and FIG. 3, including client application 112, authentication agent 214, server application 102, preliminary request validation 225, and validate request 224 can all be considered modules of the current system and method. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules.

As is well known to persons skilled in art, the various functionality components described above can be implemented in monolithic or modular fashions. For example, server application 102 can be implemented as a single application or as a system of interacting modules, each responsible for a specific functionality or step of the process, such as receiving request 121, performing preliminary request validation 225, connecting and collection information 122, receiving authentication information 123 and decision making on validating request 224. This is also true for the implementation of an authentication agent 214. Based on the above description, one skilled in the art will be able to design an implementation for a specific application.

It should be noted that the above-described examples, numbers used, and exemplary calculations are to assist in the description of this embodiment. Inadvertent typographical and mathematical errors do not detract from the utility and basic advantages of the invention.

It will be appreciated that the above descriptions are intended only to serve as examples, and that many other embodiments are possible within the scope of the present invention as defined in the appended claims.

What is claimed is:

1. A network server comprising:
at least one processor configured to:
receive from a client machine, via a first communications channel between the network server and the client machine, a request by a client application executed at the client machine to access a network resource;
based on the request, establish a second communications channel between the network server and the client machine, wherein the second communications channel is out-of-band with respect to the first communications channel;
receive from the client machine, via the second communications channel, authentication information specific to the client application for authenticating the client application, wherein the authentication information includes information indicating at least one distinguishing characteristic of the client application and is collected independently of and without interaction with the client application, wherein the distinguishing characteristic is computed based on a unique attribute of the client application; and based on the authentication information, determine whether to validate the request and provide the client application access to the network resource.

2. The network server of claim 1, wherein the request includes credentials associated with the client machine.

3. The network server of claim 1, wherein establishing the second communications channel comprises establishing the second communications channel between the network server and an authentication agent executed at the client machine, the authentication agent being distinct from the client application.

4. The network server of claim 3, wherein receiving the authentication information comprises receiving authentication information collected by the authentication agent.

5. The network server of claim 1, wherein receiving the authentication information comprises:
querying the client machine for the authentication information via the second communications channel; and
in response to querying the client machine, receiving the authentication information.

6. The network server of claim 1, wherein the second communications channel being out-of-band with respect to the first communications channel comprises:
the first communications channel being established between the network server and a first port at the client machine;
the second communications channel being established between the network server and a second port at the client machine; and
the first port is different than the second port.

7. The network server of claim 1, wherein:
determining whether to validate the request and provide the client application access to the network resource comprises determining whether the at least one distinguishing characteristic has changed.

8. The network server of claim 1, wherein the second communications channel comprises a secure communications channel.

9. The network server of claim 1, wherein the network resource comprises a database.

10. The network server of claim 1, wherein establishing the second communications channel based on the request comprises:
performing a preliminary request validation on the request; and
establishing the second communications channel based on the preliminary request validation.

11. A non-transitory computer readable medium including instructions that, when executed by at least one processor, cause the at least one processor to perform operations comprising:
receiving at a network server from a client machine, via a first communications channel between the network server and the client machine, a request by a client application executed at the client machine to access a network resource;
based on the request, establishing a second communications channel between the network server and the client machine, wherein the second communications channel is out-of-band with respect to the first communications channel;
receiving from the client machine, via the second communications channel, authentication information specific to the client application for authenticating the client application, wherein the authentication information includes information indicating at least one distinguishing characteristics of the client application and is collected independently of and without interaction with the client application, wherein the distinguishing characteristic is computed based on a unique attribute of the client application; and
based on the authentication information, determining whether to validate the request and provide the client application access to the network resource.

12. The non-transitory computer readable medium of claim 11, wherein the request includes credentials associated with the client machine.

13. The non-transitory computer readable medium of claim 11, wherein establishing the second communications channel comprises establishing the second communications channel between the network server and an authentication agent executed at the client machine, the authentication agent being distinct from the client application.

14. The non-transitory computer readable medium of claim 13, wherein establishing the second communications channel further comprises deploying the authentication agent to the client machine.

15. The non-transitory computer readable medium of claim 11, wherein receiving the authentication information comprises:
querying the client machine for the authentication information via the second communications channel; and
in response to querying the client machine, receiving the authentication information.

16. The non-transitory computer readable medium of claim 11, wherein the second communications channel being out-of-band with respect to the first communications channel comprises:
the first communications channel being established between the network server and a first port at the client machine;
the second communications channel being established between the network server and a second port at the client machine; and
the first port is different than the second port.

17. The non-transitory computer readable medium of claim 11, wherein:
determining whether to validate the request and provide the client application access to the network resource comprises determining whether the at least one characteristic has changed.

18. The non-transitory computer readable medium of claim 11, wherein the second communications channel comprises a secure communications channel.

19. The non-transitory computer readable medium of claim 11, wherein the network resource comprises a database.

20. The non-transitory computer readable medium of claim 11, wherein establishing the second communications channel based on the request comprises:
performing a preliminary request validation on the request; and
establishing the second communications channel based on the preliminary request validation.

21. A computer-implemented method comprising:
receiving at a network server from a client machine, via a first communications channel between the network server and the client machine, a request by a client application executed at the client machine to access a network resource;
based on the request, establishing a second communications channel between the network server and the client machine, wherein the second communications channel is out-of-band with respect to the first communications channel;

receiving from the client machine, via the second communications channel, authentication information specific to the client application for authenticating the client application, wherein the authentication information includes information indicating at least one distinguishing characteristic of the client application and is collected independently of and without interaction with the client application, wherein the distinguishing characteristic is computed based on a unique attribute of the client application; and based on the authentication information, determining whether to validate the request and provide the client application access to the network resource.

22. The computer-implemented method of claim 21, wherein the request includes credentials associated with the client machine.

23. The computer-implemented method of claim 21, wherein establishing the second communications channel comprises establishing the second communications channel between the network server and an authentication agent executed at the client machine, the authentication agent being distinct from the client application.

24. The computer-implemented method of claim 21, wherein receiving the authentication information comprises:

querying the client machine for the authentication information via the second communications channel; and in response to querying the client machine, receiving the authentication information.

25. The computer-implemented method of claim 21, wherein the second communications channel being out-of-band with respect to the first communications channel comprises:

the first communications channel being established between the network server and a first port at the client machine;

the second communications channel being established between the network server and a second port at the client machine; and the first port is different than the second port.

26. The computer-implemented method of claim 21, wherein:

determining whether to validate the request and provide the client application access to the network resource comprises determining whether the at least one characteristic has changed.

27. The network server of claim 5, wherein querying the client machine comprises querying an operating system of the client machine for the authentication information via the second communications channel.

28. The network server of claim 7, wherein the at least one distinguishing characteristic includes at least one of: (i) a size of a file or directory of the client application, (ii) a result of a hash-function calculation on a component of the client application, and (iii) a result of a hash-function calculation on an executable file of the client application.

* * * * *